United States Patent
Chung et al.

(10) Patent No.: US 9,537,186 B2
(45) Date of Patent: Jan. 3, 2017

(54) BATTERY PACK PROVIDING IMPROVED DISTRIBUTION UNIFORMITY IN COOLANT

(71) Applicant: LG CHEM, LTD., Seoul (KR)

(72) Inventors: Chae Ho Chung, Daejeon (KR); JiYoung Choi, Yongin-si (KR); BumHyun Lee, Seoul (KR); WonChan Park, Daejeon (KR); YongSeok Choi, Daejeon (KR)

(73) Assignee: LG CHEM, LTD., Seoul (KR)

(*) Notice: Subject to any disclaimer, the term of this patent is extended or adjusted under 35 U.S.C. 154(b) by 400 days.

(21) Appl. No.: 14/068,531

(22) Filed: Oct. 31, 2013

(65) Prior Publication Data
US 2014/0057151 A1    Feb. 27, 2014

Related U.S. Application Data

(63) Continuation of application No. PCT/KR2012/004402, filed on Jun. 4, 2012.

(30) Foreign Application Priority Data

Jun. 13, 2011 (KR) .................. 10-2011-0056651

(51) Int. Cl.
*H01M 10/60* (2014.01)
*H01M 10/65* (2014.01)
(Continued)

(52) U.S. Cl.
CPC ............ *H01M 10/5059* (2013.01); *B60K 1/04* (2013.01); *B60L 11/1874* (2013.01);
(Continued)

(58) Field of Classification Search
USPC .............................. 429/120; 29/623.1–623.5
See application file for complete search history.

(56) References Cited

U.S. PATENT DOCUMENTS 5,212,024 A * 5/1993 Klink .................. H01M 2/1077
429/120
5,589,290 A    12/1996 Klink et al.
(Continued)

FOREIGN PATENT DOCUMENTS

JP    2006-139928 A    6/2006
JP    2011-23239 A    2/2011
(Continued)

OTHER PUBLICATIONS

International Search Report issued in PCT/KR2012/004402, mailed on Jan. 3, 2013.

*Primary Examiner* — Matthew Merkling
(74) *Attorney, Agent, or Firm* — Birch, Stewart, Kolasch & Birch, LLP (57) ABSTRACT

Disclosed is a battery pack including battery cells or unit modules (unit cells), wherein the battery pack is configured to have a structure in which the unit cells are uprightly arranged in a width direction (a horizontal direction) of the battery pack in a state in which a spacing distance for coolant flow is provided between the respective unit cells to constitute a battery module, a plurality of battery modules is arranged to constitute a battery module group, battery modules groups are vertically arranged from a coolant introduction direction of a coolant inlet port in a height direction (a vertical direction) of the battery pack to have a two or more layer structure or laterally arranged from the coolant introduction direction of the coolant inlet port in a length direction (a horizontal direction) of the battery pack to have a two or more row structure.

20 Claims, 6 Drawing Sheets

(51) Int. Cl.
  *B60K 1/04* (2006.01)
  *B60K 11/06* (2006.01)
  *H01M 10/6557* (2014.01)
  *B60L 11/18* (2006.01)
  *H01M 10/647* (2014.01)
  *H01M 10/613* (2014.01)
  *H01M 2/10* (2006.01)
  *H01M 10/625* (2014.01)
  *H01M 10/6563* (2014.01)
  *B60K 1/00* (2006.01)

(52) U.S. Cl.
  CPC ....... *H01M 2/1077* (2013.01); *H01M 10/613* (2015.04); *H01M 10/625* (2015.04); *H01M 10/647* (2015.04); *H01M 10/6557* (2015.04); *H01M 10/6563* (2015.04); *B60K 11/06* (2013.01); *B60K 2001/005* (2013.01); *H01M 2220/20* (2013.01); *Y02T 10/7005* (2013.01); *Y02T 10/705* (2013.01)

(56) References Cited

U.S. PATENT DOCUMENTS

| | | | | |
|---|---|---|---|---|
| 8,268,472 B2* | 9/2012 | Ronning | ........... | H01M 10/6563 429/120 |
| 8,697,270 B2* | 4/2014 | Tan | ........... | H01M 2/1077 429/100 |
| 2002/0127362 A1* | 9/2002 | Jansen | ........... | B32B 3/02 428/40.1 |
| 2006/0216581 A1 | 9/2006 | Hwang et al. | | |
| 2007/0026301 A1* | 2/2007 | Lee | ........... | H01M 2/1077 429/120 |
| 2009/0305124 A1 | 12/2009 | Ahn et al. | | |
| 2012/0052358 A1* | 3/2012 | Tan | ........... | H01M 2/1077 429/120 |
| 2015/0004458 A1* | 1/2015 | Lee | ........... | H01M 10/625 429/120 |

FOREIGN PATENT DOCUMENTS

| | | |
|---|---|---|
| JP | 2011-90830 A | 5/2011 |
| KR | 10-2005-0007648 A | 1/2005 |
| KR | 10-2005-0070727 A | 7/2005 |
| KR | 10-2007-0006952 A | 1/2007 |
| WO | WO 2010/067944 A1 | 6/2010 |
| WO | WO 2010/109293 A1 | 9/2010 |

* cited by examiner

BATTERY PACK PROVIDING IMPROVED DISTRIBUTION UNIFORMITY IN COOLANT

CROSS REFERENCE TO RELATED APPLICATIONS

This application is a Bypass Continuation of PCT International Application No. PCT/KR2012/004402 filed on Jun. 4, 2012, which claims priority under 35 U.S.C §119(a) to Patent Application No. 10-2011-0056651 filed in the Republic of Korea on Jun. 13, 2011, all of which are hereby expressly incorporated by reference into the present application.

TECHNICAL FIELD

The present invention relates to a battery pack including battery cells or unit cells that can be charged and discharged, wherein the battery pack is configured to have a structure in which the unit cells are uprightly arranged in a width direction of the battery pack in a state in which a spacing distance for coolant flow is provided between the respective unit cells to constitute a battery module, one or more battery modules are laterally arranged in the width direction of the battery pack to constitute a battery module group, battery modules groups are vertically arranged from a coolant introduction direction of a coolant inlet port in a height direction of the battery pack to have a two or more layer structure or laterally arranged from the coolant introduction direction of the coolant inlet port in a length direction (a horizontal direction) of the battery pack to have a two or more row structure, a coolant introduction part is formed at a lower part of each battery module group, a coolant discharge part includes a first coolant discharge part formed at an upper part of each battery module group and a second coolant discharge part located at a left side of at least one battery module group such that the second coolant discharge part communicates with the first coolant discharge part, and a coolant flow channel defined between the coolant inlet port and the coolant outlet port is configured to have a structure in which a coolant passes through the first coolant discharge part and the second coolant discharge part and is then discharged upward through the coolant outlet port.

BACKGROUND ART

Recently, a secondary battery, which can be charged and discharged, has been widely used as an energy source for wireless mobile devices. In addition, the secondary battery has attracted considerable attention as a power source for electric vehicles (EV) and hybrid electric vehicles (HEV), which have been developed to solve problems, such as air pollution, caused by existing gasoline and diesel vehicles using fossil fuels.

Small-sized mobile devices use one or several battery cells per device. On the other hand, middle or large-sized devices, such as vehicles, use a middle or large-sized battery module having a plurality of battery cells electrically connected to one another because high power and large capacity are necessary for the middle or large-sized devices.

Preferably, the middle or large-sized battery module is manufactured so as to have as small a size and weight as possible. For this reason, a prismatic battery or a pouch-shaped battery, which can be stacked with high integration and has a small weight to capacity ratio, is usually used as a battery cell of the middle or large-sized battery module. In particular, much interest is currently focused on the pouch-shaped battery, which uses an aluminum laminate sheet as a sheathing member, because the pouch-shaped battery is lightweight, the manufacturing costs of the pouch-shaped battery are low, and it is possible to easily modify the shape of the pouch-shaped battery.

In order for the middle or large-sized battery module to provide power and capacity required by a specific apparatus or device, it is necessary for the middle or large-sized battery module to be configured to have a structure in which a plurality of battery cells is electrically connected in series to each other or in series and parallel to each other and the battery cells are stable against external force.

Meanwhile, the battery cells constituting the middle or large-sized battery module may be secondary batteries which can be charged and discharged. Consequently, a large amount of heat is generated from such high-power, large-capacity secondary batteries during charge and discharge of the secondary batteries. If the heat, generated from the unit battery during charge and discharge of the unit battery, is not effectively removed from the unit battery, the heat accumulates in the unit battery with the result that deterioration of the unit battery is accelerated. According to circumstances, the unit battery may catch fire or explode. For this reason, a battery pack for vehicles, which is a high-power, large-capacity battery, needs a cooling system to cool battery cells mounted in the battery pack.

In a middle or large-sized battery pack including a plurality of battery cells, on the other hand, the deterioration in performance of some battery cells leads to the deterioration in performance of the entire battery pack. One of the main factors causing the non-uniformity in performance is the non-uniformity of cooling between the battery cells. For this reason, it is necessary to provide a structure to secure cooling uniformity during the flow of a coolant.

Figure 1:
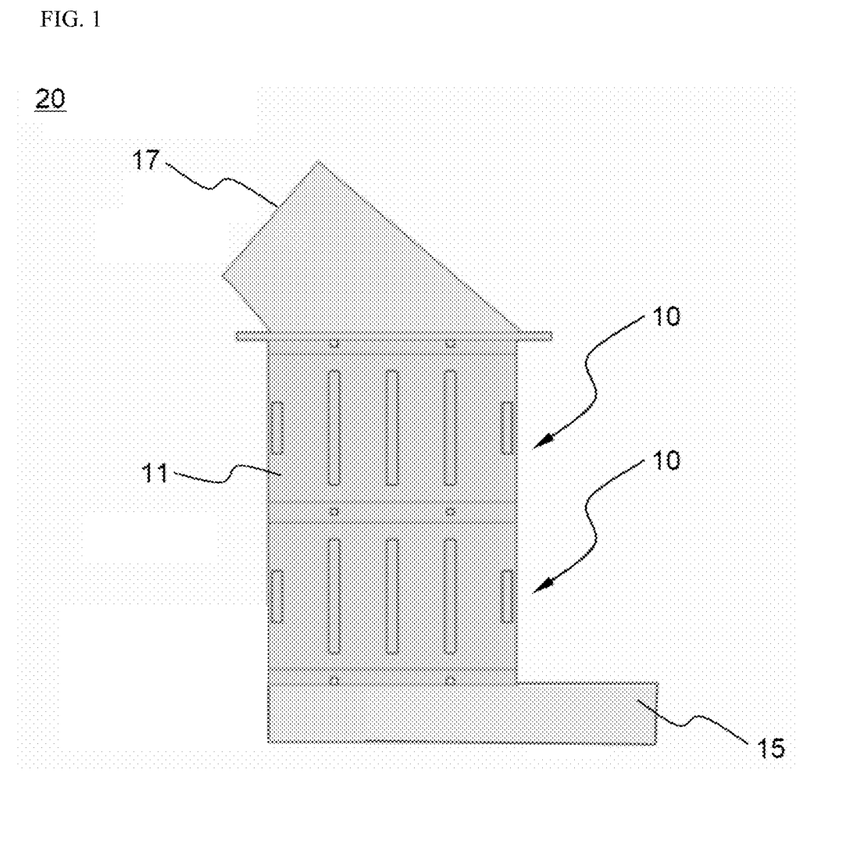
FIG. 1 is a plan typical view showing a conventional middle or large-sized battery pack.

As shown in FIG. 1, a conventional middle or large-sized battery pack may be configured to have a structure in which battery modules are uprightly arranged in a width direction of a battery pack 20 to constitute a battery module group 10 and two battery modules groups 10 are vertically arranged from a coolant introduction direction of a coolant inlet port 15 in a height direction of the battery pack 20 to have a two-layer structure.

Consequently, a coolant, introduced from the coolant inlet port 15, which is formed at the lower part of the battery pack, sequentially passes through flow channels defined between the unit cells 11 to cool the unit cells 11 and is discharged from the battery pack through a coolant outlet port 17 formed at the upper part of the battery pack.

However, the above structure affects distribution of flow rate of the coolant introduced into the unit cells and causes temperature deviation between the layers. In addition, the coolant flow channel is increased to generate differential pressure. As a result, it is difficult to achieve uniform cooling between the battery cells.

Consequently, there is a high necessity for technology to fundamentally solve the above problems.

DISCLOSURE

Technical Problem

Therefore, the present invention has been made to solve the above problems and other technical problems that have yet to be resolved.

It is an object of the present invention to provide a battery pack including a plurality of coolant introduction parts and a specific coolant discharge part, which are formed to minimize differential pressure between unit cells, thereby restraining performance of the unit cells from being lowered and thus improving cooling efficiency.

Technical Solution

In accordance with one aspect of the present invention, the above and other objects can be accomplished by the provision of a battery pack including battery cells or unit modules (unit cells) that can be charged and discharged, wherein the battery pack is configured to have a structure in which the unit cells are uprightly arranged in a width direction (a horizontal direction) of the battery pack in a state in which a spacing distance for coolant flow is provided between the respective unit cells to constitute a battery module, one or more battery modules are laterally arranged in the width direction of the battery pack to constitute a battery module group, battery modules groups are vertically arranged from a coolant introduction direction of a coolant inlet port in a height direction (a vertical direction) of the battery pack to have a two or more layer structure or laterally arranged from the coolant introduction direction of the coolant inlet port in a length direction (a horizontal direction) of the battery pack to have a two or more row structure, a flow space ('a coolant introduction part') extending from the coolant inlet port to each battery module group is formed at a lower part of each battery module group, another flow space ('a coolant discharge part') extending from each battery module group to a coolant outlet port includes a first coolant discharge part formed at an upper part of each battery module group and a second coolant discharge part located at a left side of at least one battery module group such that the second coolant discharge part communicates with the first coolant discharge part, and a coolant flow channel defined between the coolant inlet port and the coolant outlet port is configured to have a structure in which a coolant, introduced through each coolant inlet port, passes by each unit cell to cool each unit cell, passes through the first coolant discharge part and the second coolant discharge part, and is discharged upward through the coolant outlet port.

In the battery pack according to the present invention, a plurality of coolant introduction parts and a specific coolant discharge part are formed unlike a conventional battery pack. The respective coolant introduction parts have the same pressure distribution. Consequently, it is possible to minimize deviation in flow rate between the unit cells of the respective battery module groups and to greatly reduce deviation in temperature of the unit cells of the respective battery module groups.

In a preferred example, a partition plate to simultaneously provide a coolant discharge channel of a lower battery module group and a coolant introduction channel of an upper battery module group may be disposed between the respective battery module groups disposed in the vertical direction. Consequently, it is possible to efficiently achieve coolant introduction and discharge and, in addition, to minimize overall volume of the battery pack.

In another preferred example, a partition plate having a structure in which the coolant introduction part is gradually narrowed in a coolant flow direction to guide the coolant may be formed between the respective battery module groups disposed in the horizontal direction.

Specifically, the partition plate may be mounted to have a tilted structure in which the coolant introduction part is gradually narrowed in a coolant flow direction with respect to the upper battery module group.

That is, flow speed of the coolant, introduced into the coolant introduction part, gradually increases while the coolant passes by the tilted structure and then the coolant reaches the opposite end of the coolant introduction part. Consequently, it is possible to uniformly cool all of the unit cells, i.e. the unit cells adjacent to the coolant introduction part and the unit cells far from the coolant introduction part.

In another example, the uppermost one of the battery module groups disposed in the vertical direction may be provided at an upper part thereof with a coolant discharge plate, the coolant discharge plate being mounted to have a tilted structure in which the coolant discharge part is gradually widened in the coolant flow direction. In this case, therefore, it is possible to improve uniformity of the coolant.

In addition, the lowermost one of the battery module groups disposed in the vertical direction may be provided at a lower part thereof with a coolant introduction plate, the coolant introduction plate being mounted to have a tilted structure in which the coolant introduction part is gradually narrowed in the coolant flow direction. Even in this case, therefore, it is possible to improve uniformity of the coolant.

The second coolant discharge part may be configured to have various structures. Preferably, the second coolant discharge part is formed at the left side of each of the battery module groups disposed in the vertical direction excluding the lowermost battery module group.

In this structure, the coolant discharged by the tilted structure as described above may be collected in the second coolant discharge part and then easily discharged from the battery pack through the coolant outlet port.

Meanwhile, the second coolant discharge part may be formed in a space defined between a left side of each battery module group and a pack case spaced apart from the left side of each battery module group by a predetermined width. Consequently, the temperature of the cooled battery modules may be maintained without being affected by the coolant, the temperature of which has increased, by the provision of the space.

In the above structure, the width between the left side of each battery module group and the inside of the pack case may be set within a range to maintain the temperature of cooled battery modules and, at the same time, to provide a battery pack having an appropriate overall size. For example, the width may be equivalent to 5 to 30% the height of each battery module.

The coolant inlet port and the coolant outlet port may be configured to have various structures. For example, the coolant inlet port may be located at a right lower part of each of the battery module groups disposed in the vertical direction and the coolant outlet port may be located at a left upper part of the uppermost one of the battery module groups disposed in the vertical direction.

According to circumstances, a driving fan to provide flow driving force to the coolant is further mounted in the coolant inlet port and/or the coolant outlet port such that the coolant, introduced through the coolant inlet port, passes by the battery modules, rapidly and smoothly flows to the coolant outlet port, and is discharged from the battery pack through the coolant outlet port. In addition, a suction fan may be mounted in the coolant outlet port.

In another preferred example, the coolant inlet port may be connected to an air conditioner system of a vehicle such that cooled air, i.e. low-temperature air, is introduced into the coolant inlet port. Consequently, it is possible to more efficiently cool the unit cells using the low-temperature air than in an air cooling type cooling structure using room-temperature air.

In addition, the battery pack according to the present invention may be used in a structure in which cooling efficiency is particularly serious, i.e. a structure in which the height of the battery pack is twice or more, preferably two to six times, the width of the battery pack.

Meanwhile, the number of the unit cells constituting each battery module group may be changed depending upon a required driving output of a vehicle and a height limit of the vehicle. For example, each battery module group may include 8 to 24 unit cells.

For reference, the term 'battery module' used in the specification inclusively means the structure of a battery system configured to have a structure in which two or more chargeable and dischargeable battery cells or unit modules are mechanically coupled and, at the same time, electrically connected to each other to provide high power and large capacity. Therefore, the battery module itself may constitute a single apparatus or a part of a large-sized apparatus. For example, a large number of small-sized battery modules may be connected to each other to constitute a large-sized battery module. Alternatively, a small number of battery cells may be connected to each other to constitute a unit module, and a plurality of the unit modules may be connected to each other.

The unit cells may be spaced apart from each other by a size equivalent to 5 to 50% the thickness of each unit cell such that the coolant effectively cools the unit cells while passing between the unit cells.

For example, if the distance between the unit cells is less than 5% the thickness of each unit cell, it is difficult to achieve a desired coolant cooling effect, which is not preferable. On the other hand, if the distance between the unit cells is greater than 50% the thickness of each unit cell, the overall size of the battery module constituted by the plurality of unit cells is increased, which is not preferable.

Meanwhile, each unit module may be configured to have a structure in which plate-shaped battery cells, each of which has electrode terminals formed at the upper end and the lower end thereof, are connected in series to each other. For example, each unit module may include two or more battery cells, the electrode terminals of which are connected in series to each other, and a pair of high-strength cell covers coupled to cover outsides of the battery cells excluding the electrode terminals of the battery cells.

Each of the plate-shaped battery cells is a battery cell having a small thickness and a relatively large width and length so as to minimize the overall size of a battery module when the battery cells are stacked to constitute the battery module. In a preferred example, each of the battery cells may be a secondary battery configured to have a structure in which an electrode assembly is mounted in a battery case formed of a laminate sheet including a resin layer and a metal layer, and electrode terminals protrude from the upper and lower ends of the battery case. Specifically, the electrode assembly may be mounted in a pouch-shaped case formed of an aluminum laminate sheet. The secondary battery with the above-described structure may also be referred to as a pouch-shaped battery cell.

Each of the battery cells may be a secondary battery, such as a nickel metal hydride secondary battery or a lithium secondary battery. The lithium secondary battery is particularly preferable since the lithium secondary battery has high energy density and large discharge voltage.

In the present invention, the coolant is not particularly restricted so long as the coolant is a fluid that is capable of cooling the battery cells. The coolant may be air or water. Preferably, the coolant is air. The coolant may be supplied by an additional device, such as a fan, and introduced into the coolant inlet port of the battery pack according to the present invention. However, force to drive the coolant is not limited by the fan.

In accordance with another aspect of the present invention, there is provided an electric vehicle, a hybrid electric vehicle, a plug-in hybrid electric vehicle, or a power storage device using the battery pack with the above-stated construction as a power source.

Particularly, in a case in which the battery pack is used in the electric vehicle, a hybrid electric vehicle, or a plug-in hybrid electric vehicle, as the power source, the battery pack may be mounted in a trunk of the vehicle.

The electric vehicle, the hybrid electric vehicle, the plug-in hybrid electric vehicle, and the power storage device using the battery pack as the power source are well known in the art to which the present invention pertains and thus a detailed description thereof will be omitted.

DESCRIPTION OF DRAWINGS

The above and other objects, features and other advantages of the present invention will be more clearly understood from the following detailed description taken in conjunction with the accompanying drawings, in which.

BEST MODE

Now, preferred embodiments of the present invention will be described in detail with reference to the accompanying drawings. It should be noted, however, that the scope of the present invention is not limited by the illustrated embodiments.

Figure 2:
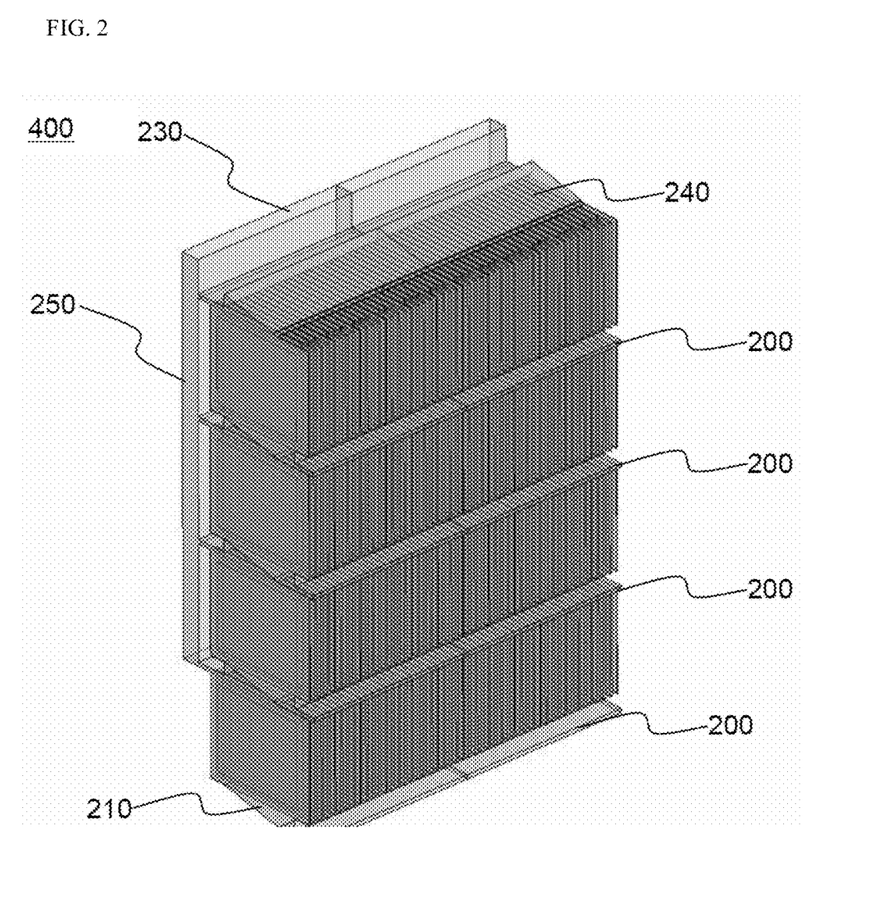
FIG. 2 is a typical view showing a battery pack according to an embodiment of the present invention.
Figure 3:
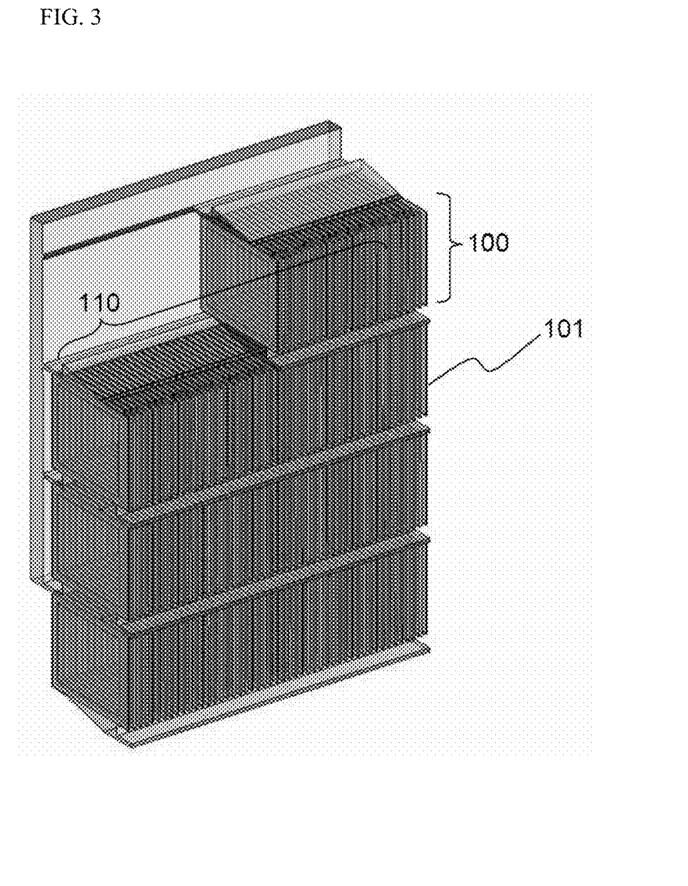
FIG. 3 is a view showing a portion of FIG. 2.

FIG. 2 is a perspective view typically showing a battery pack according to an embodiment of the present invention and FIG. 3 is a view typically showing a portion of FIG. 2.

Referring to these drawings, a battery pack 400 is configured to have a structure in which unit cells 101 are uprightly arranged in a width direction of a battery pack 400 in a state in which the unit cells 101 are spaced apart from each other such that a coolant flows between the unit cells 101 to constitute a battery module 100. Two battery modules 100 are laterally arranged in the width direction of the battery pack 400 to constitute a battery module group 110. Battery module groups 110 are vertically arranged from a coolant introduction direction in a height direction of the battery pack 400 to have a four-layer structure.

Each battery module group 110 is provided at the lower part thereof with a coolant introduction part 210 extending from a coolant inlet port 200 to each battery module group 110. A coolant discharge part extending from each battery module group 110 to a coolant outlet port 230 includes a first coolant discharge part 240 formed at the upper part of each battery module group 110 and a second coolant discharge part 250 located at the left side of each battery module group 110 such that the second coolant discharge part 250 communicates with the first coolant discharge part 240.

In addition, the coolant inlet port 200 is located at the right lower part of each of the battery module groups 110 disposed in the vertical direction and the coolant outlet port 230 is located at the left upper part of the uppermost one of the battery module groups disposed in the vertical direction.

Consequently, a coolant, introduced through each coolant inlet port 200, passes by each unit cell 101 to cool each unit cell 101, passes through the first coolant discharge part 240 and the second coolant discharge part 250, and is discharged upward through the coolant outlet port 230.

According to circumstances, the coolant inlet ports 200 may be connected to an air conditioner system (not shown) of a vehicle such that cooled air, i.e. low-temperature air, is introduced into the coolant inlet ports 200, horizontally passes by the battery module groups 110, and is discharged through the coolant outlet port 230. Consequently, it is possible to greatly improve cooling efficiency of the battery modules as compared with an air cooling type cooling system using room-temperature air.

Figure 4:
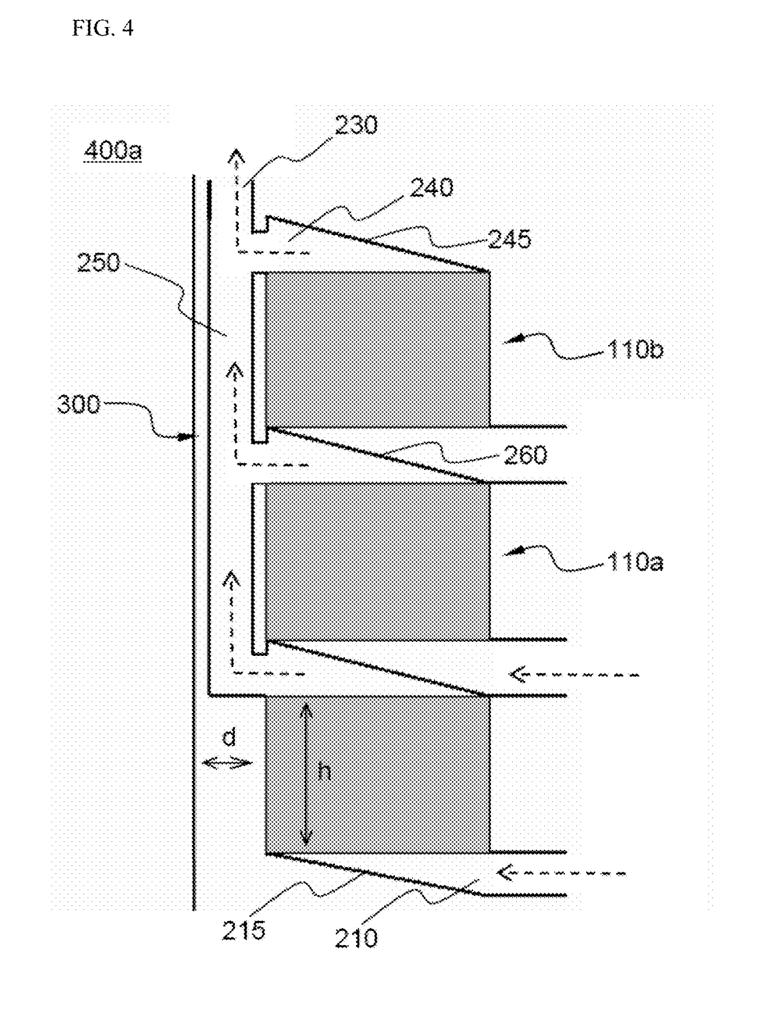
FIG. 4 is a side view showing a battery pack according to another embodiment of the present invention.

FIG. 4 is a side view typically showing a battery pack according to another embodiment of the present invention.

Referring to FIG. 4 together with FIGS. 2 and 3, a battery pack 400a is configured to have a structure in which battery module groups are vertically arranged from a coolant introduction direction in a height direction of the battery pack 400a to have a three-layer structure.

Between the respective battery module groups disposed in a vertical direction is disposed a partition plate 260 to simultaneously provide a coolant discharge channel of a lower battery module group 110a and a coolant introduction channel of an upper battery module group 110b.

The partition plate 260 is mounted to have a tilted structure in which a coolant introduction part 210 is gradually narrowed in a coolant flow direction with respect to the upper battery module group 110b.

The uppermost one of the battery module groups disposed in the vertical direction is provided at the upper part thereof with a coolant discharge plate 245, which is mounted to have a tilted structure in which a coolant discharge part 240 is gradually widened in the coolant flow direction. On the other hand, the lowermost one of the battery module groups 110 disposed in the vertical direction is provided at the lower part thereof with a coolant introduction plate 215, which is mounted to have a tilted structure in which the coolant introduction part 210 is gradually narrowed in the coolant flow direction. Consequently, uniformity of the coolant may be improved.

Meanwhile, a second coolant discharge part 250 is formed at the left side of each of the battery module groups disposed in the vertical direction excluding the lowermost battery module group such that the coolant collected through the second coolant discharge part 250 may be easily discharged through a coolant outlet port 230.

In addition, the second coolant discharge part 250 is formed in a space defined between the left sides of the respective battery module groups 110 (see FIG. 3) and a pack case 300 spaced apart from the left sides of the respective battery module groups 110 by a predetermined width d. The width d is equivalent to about 20% a height h of each battery module 100.

Figure 5:
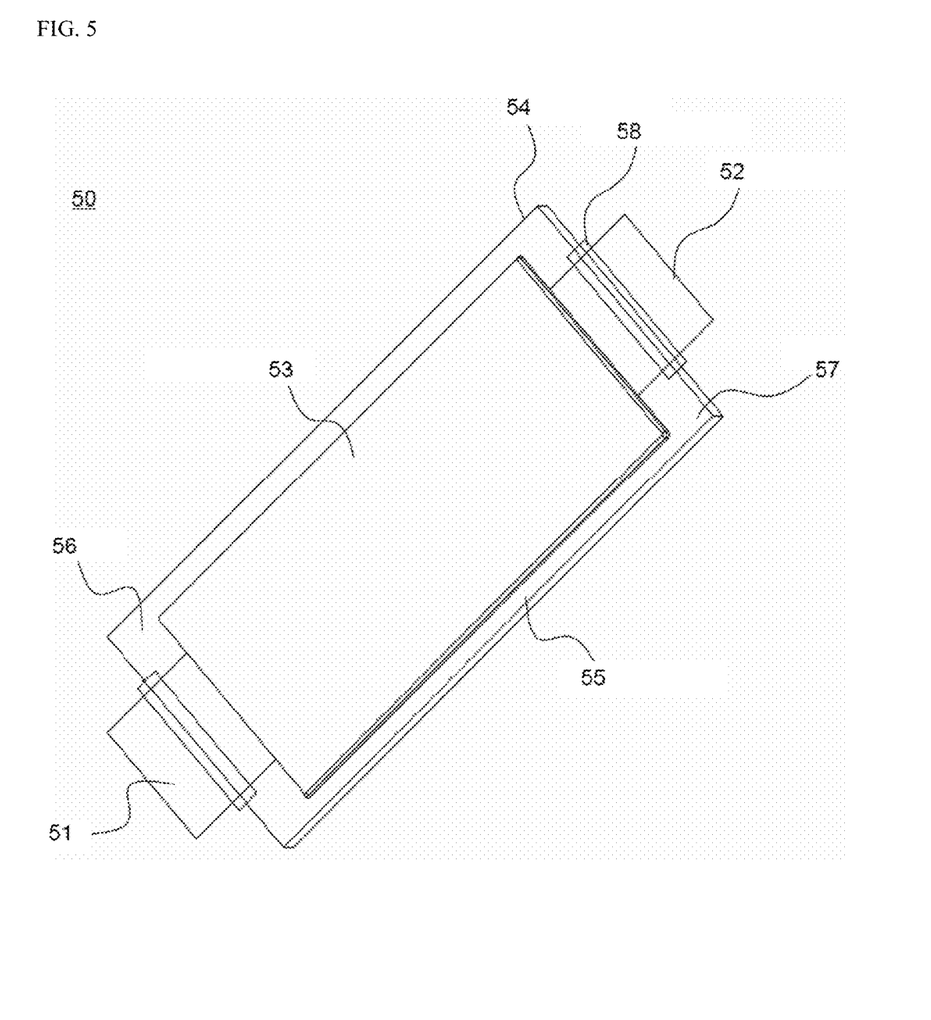
FIG. 5 is a perspective view showing a pouch-shaped battery cell.

FIG. 5 is a perspective view typically showing a pouch-shaped battery cell.

Referring to FIG. 5, a pouch-shaped battery cell 50 is configured to have a structure in which two electrode leads 51 and 52 protrude from the upper end and the lower end of a battery cell body 53, respectively, in a state in which the electrode leads 51 and 52 are opposite to each other. A sheathing member 54 includes upper and lower sheathing parts. That is, the sheathing member 54 is a two-unit member. In a state in which an electrode assembly (not shown) is mounted in a receiving part which is defined between the upper and lower sheathing parts of the sheathing member 54, opposite sides 55, upper ends 56, and lower ends 57, which are contact regions of the upper and lower sheathing parts of the sheathing member 54, are bonded to each other, whereby the battery cell 50 is manufactured.

The sheathing member 54 is configured to have a laminate structure of a resin layer/a metal film layer/a resin layer. Consequently, it is possible to bond the opposite sides 55, the upper ends 56, and the lower ends 57 of the upper and lower sheathing parts of the sheathing member 54, which are in contact with each other, to each other by applying heat and pressure to the opposite sides 55, the upper ends 56, and the lower ends 57 of the upper and lower sheathing parts of the sheathing member 54 so as to weld the resin layers thereof to each other. According to circumstances, the opposite sides 55, the upper ends 56, and the lower ends 57 of the upper and lower sheathing parts of the sheathing member 54 may be bonded to each other using a bonding agent. For the opposite sides 55 of the sheathing member 54, the same resin layers of the upper and lower sheathing parts of the sheathing member 54 are in direct contact with each other, whereby uniform sealing at the opposite sides 55 of the sheathing member 54 is accomplished by welding. For the upper ends 56 and the lower ends 57 of the sheathing member 54, on the other hand, the electrode leads 51 and 52 protrude from the upper ends 56 and the lower ends 57 of the sheathing member 54, respectively. For this reason, the upper ends 56 and the lower ends 57 of the upper and lower sheathing parts of the sheathing member 54 are thermally welded to each other, in a state in which a film type sealing member 58 is interposed between the electrode terminals 51 and 52 and the sheathing member 54, in consideration of the thickness of the electrode leads 51 and 52 and the difference in material between the electrode leads 51 and 52 and the sheathing member 54, so as to increase sealability of the sheathing member 54.

Figure 6:
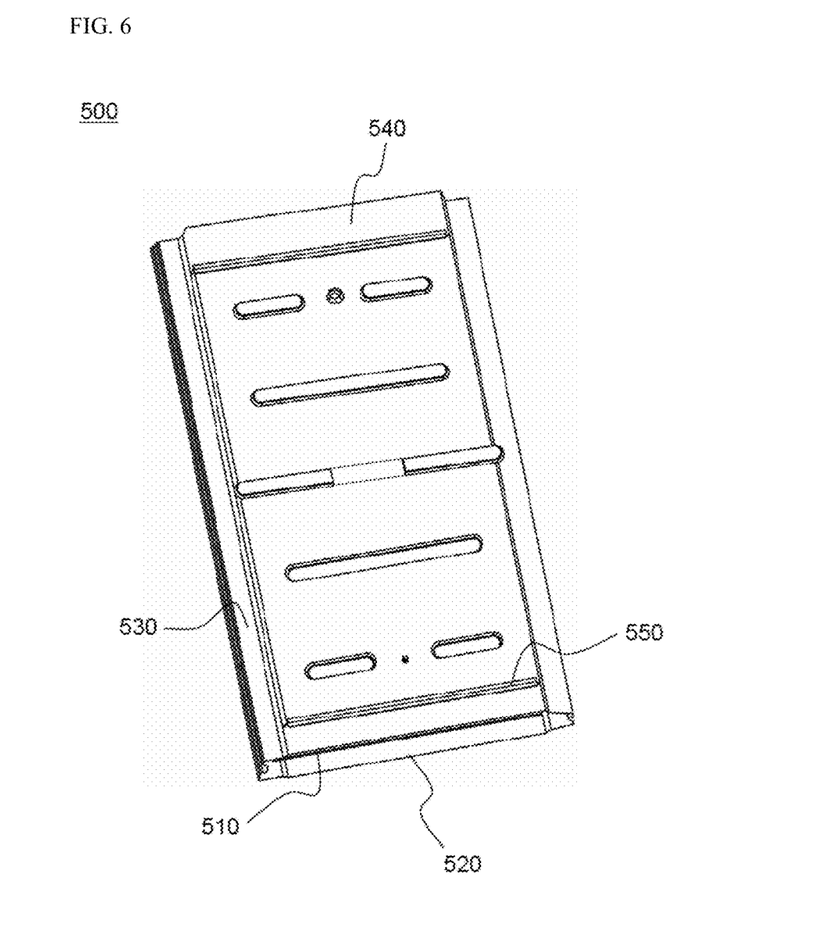
FIG. 6 is a perspective view showing a cell cover, in which the battery cell of FIG. 5 will be mounted to constitute a unit module.

FIG. 6 is a perspective view showing a cell cover, in which two battery cells, one of which is shown in FIG. 5, will be mounted to constitute a unit module.

Referring to FIG. 6, a cell cover 500 has two pouch-shaped battery cells (not shown), one of which is shown in FIG. 5, mounted therein. The cell cover 500 serves not only to increase mechanical strength of the battery cells but also to enable the battery cells to be easily mounted to a module case (not shown). The two battery cells are mounted in the cell cover 500 in a state in which one-side electrode terminals of the battery cells are connected in series to each other and bent in tight contact.

The cell cover 500 includes a pair of members 510 and 520 which are configured to be coupled to each other. The cell cover 500 is made of a high-strength metal sheet. Steps 530 to enable the module to be easily fixed are formed at left and right side edges of the cell cover 500 and steps 540 having the same function are formed at the upper end and the lower end of the cell cover 500. In addition, fixing parts 550 are formed at the upper end and the lower end of the cell cover 500 such that the fixing parts 550 extend in the width direction of the cell cover 500. Consequently, the cell cover 500 is easily mounted to the module case (not shown).

As can be seen from the above embodiments, the coolant introduction parts and the coolant discharge part are formed at the battery pack. Consequently, differential pressure between the unit cells is minimized, thereby restraining performance of the unit cells from being lowered and improving cooling efficiency.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, a battery pack according to the present invention includes a plurality of coolant introduction parts and a specific coolant discharge part. Consequently, it is possible to uniformly supply a coolant to each unit cell and to minimize a temperature difference and differential pressure between the unit cells during such a cooling process.

The invention claimed is:

1. A battery pack comprising battery cells or unit modules (unit cells) that can be charged and discharged, wherein the battery pack is configured to have a structure in which
the unit cells are uprightly arranged in a width direction (a horizontal direction) of the battery pack in a state in which a spacing distance for coolant flow is provided between the respective unit cells to constitute a battery module,
one or more battery modules are laterally arranged in the width direction of the battery pack to constitute a battery module group,
battery modules groups are vertically arranged from a coolant introduction direction of a coolant inlet port in a height direction (a vertical direction) of the battery pack to have a two or more layer structure or laterally arranged from the coolant introduction direction of the coolant inlet port in a length direction (a horizontal direction) of the battery pack to have a two or more row structure,
a flow space ('a coolant introduction part') extending from the coolant inlet port to each battery module group is formed at a lower part of each battery module group,
another flow space ('a coolant discharge part') extending from each battery module group to a coolant outlet port comprises a first coolant discharge part formed at an upper part of each battery module group and a second coolant discharge part located at a left side of at least one battery module group such that the second coolant discharge part communicates with the first coolant discharge part, and
a coolant flow channel defined between the coolant inlet port and the coolant outlet port is configured to have a structure in which a coolant, introduced through each coolant inlet port, passes by each unit cell to cool each unit cell, passes through the first coolant discharge part and the second coolant discharge part, and is discharged upward through the coolant outlet port,
wherein a partition plate to simultaneously provide a coolant discharge channel of a lower battery module group and a coolant introduction channel of an upper battery module group is disposed between the respective battery module groups disposed in the vertical direction, and
wherein the partition plate is mounted to have a tilted structure in which the coolant introduction part is gradually narrowed in a coolant flow direction with respect to the upper battery module group.

2. The battery pack according to claim 1, wherein a partition plate having a structure in which the coolant introduction part is gradually narrowed in a coolant flow direction to guide the coolant is formed between the respective battery module groups disposed in the horizontal direction.

3. The battery pack according to claim 1, wherein an uppermost one of the battery module groups disposed in the vertical direction is provided at an upper part thereof with a coolant discharge plate, the coolant discharge plate being mounted to have a tilted structure in which the coolant discharge part is gradually widened in the coolant flow direction.

4. The battery pack according to claim 1, wherein a lowermost one of the battery module groups disposed in the vertical direction is provided at a lower part thereof with a coolant introduction plate, the coolant introduction plate being mounted to have a tilted structure in which the coolant introduction part is gradually narrowed in the coolant flow direction.

5. The battery pack according to claim 1, wherein the second coolant discharge part is formed at a left side of each of the battery module groups disposed in the vertical direction excluding a lowermost battery module group.

6. The battery pack according to claim 1, wherein the second coolant discharge part is formed in a space defined between a left side of each battery module group and a pack case spaced apart from the left side of each battery module group by a predetermined width.

7. The battery pack according to claim 6, wherein the width is equivalent to 5 to 30% a height of each battery module.

8. The battery pack according to claim 1, wherein the coolant inlet port is located at a right lower part of each of the battery module groups disposed in the vertical direction.

9. The battery pack according to claim 1, wherein the coolant outlet port is located at a left upper part of an uppermost one of the battery module groups disposed in the vertical direction.

10. The battery pack according to claim 1, wherein a driving fan to provide flow driving force to the coolant is further mounted in the coolant inlet port and/or the coolant outlet port.

11. The battery pack according to claim 1, wherein the coolant inlet port is connected to an air conditioner system of a vehicle such that cooled air, i.e. low-temperature air, is introduced into the coolant inlet port.

12. The battery pack according to claim 1, wherein the battery pack is configured to have a structure in which the height of the battery pack is twice or more the width of the battery pack.

13. The battery pack according to claim 1, wherein each battery module group comprises 8 to 24 unit cells.

14. The battery pack according to claim 1, wherein the unit cells are spaced apart from each other by a size equivalent to 5 to 50% a thickness of each unit cell.

15. The battery pack according to claim 1, wherein each unit module comprises two or more battery cells, electrode terminals of which are connected in series to each other, and a pair of cell covers coupled to cover outsides of the battery cells excluding the electrode terminals of the battery cells.

16. The battery pack according to claim 1, wherein each battery cell is configured to have a structure in which an electrode assembly is mounted in a pouch-shaped case comprising a resin layer and a metal layer.

17. The battery pack according to claim 1, wherein each battery cell is a lithium secondary battery.

18. The battery pack according to claim 1, wherein the coolant is air.

19. A device comprising a battery pack according to claim 1 as a power source.

20. The device according to claim 19, wherein the device is an electric vehicle, a hybrid electric vehicle, a plug-in hybrid electric vehicle, or a power storage device.

* * * * *